(12) United States Patent
Shido et al.

(10) Patent No.: US 11,192,329 B2
(45) Date of Patent: Dec. 7, 2021

(54) DECORATIVE SHEET WITH ADHESIVE

(71) Applicant: AICA KOGYO CO., LTD., Kiyosu (JP)

(72) Inventors: Kazuya Shido, Kiyosu (JP); Kazuki Kouyama, Kiyosu (JP); Naho Konishi, Kiyosu (JP); Keisuke Shitan, Kiyosu (JP)

(73) Assignee: AICA KOGYO CO., LTD., Kiyosu (JP)

( * ) Notice: Subject to any disclaimer, the term of this patent is extended or adjusted under 35 U.S.C. 154(b) by 390 days.

(21) Appl. No.: 16/319,085

(22) PCT Filed: Jul. 21, 2017

(86) PCT No.: PCT/JP2017/026575
§ 371 (c)(1),
(2) Date: Jan. 18, 2019

(87) PCT Pub. No.: WO2018/016649
PCT Pub. Date: Jan. 25, 2018

(65) Prior Publication Data
US 2020/0122428 A1    Apr. 23, 2020

(30) Foreign Application Priority Data

Jul. 21, 2016    (JP) .............................. JP2016-142952

(51) Int. Cl.
*B32B 5/10*        (2006.01)
*B32B 7/12*        (2006.01)
(Continued)

(52) U.S. Cl.
CPC ................. *B32B 5/10* (2013.01); *B32B 5/022* (2013.01); *B32B 5/024* (2013.01); *B32B 5/26* (2013.01);
(Continued)

(58) Field of Classification Search
CPC .. B32B 5/10; B32B 5/26; B32B 5/022; B32B 5/024; B32B 7/12; B32B 29/02;
(Continued)

(56) References Cited

U.S. PATENT DOCUMENTS 5,180,627 A * 1/1993 Inoue ....................... B32B 7/12
428/214
2008/0050565 A1* 2/2008 Gross ..................... D04H 1/425
428/212

FOREIGN PATENT DOCUMENTS

JP    S63192025 U    12/1988
JP    08058027 A *   3/1996
(Continued)

OTHER PUBLICATIONS

[NPL-1] Shido et al. (JP 2015-199346 A). Oct. 2015 (EPO machine translation to English). (Year: 2015).*
(Continued)

*Primary Examiner* — David Sample
*Assistant Examiner* — Donald M Flores, Jr.
(74) *Attorney, Agent, or Firm* — Withrow & Terranova, P.L.L.C.; Vincent K. Gustafson (57) ABSTRACT

A decorative sheet with adhesive according to the present disclosure comprises a decorative plate layer and an adhesive layer. The decorative plate layer includes a decorative layer and a mixed paper layer which includes a magnesium silicate mixed paper with bound water.

14 Claims, 5 Drawing Sheets

(51) Int. Cl.
*B32B 29/06* (2006.01)
*B32B 29/02* (2006.01)
*B32B 5/02* (2006.01)
*B32B 5/26* (2006.01)

(52) U.S. Cl.
CPC ............... *B32B 7/12* (2013.01); *B32B 29/02* (2013.01); *B32B 29/06* (2013.01); *B32B 2250/03* (2013.01); *B32B 2250/04* (2013.01); *B32B 2260/023* (2013.01); *B32B 2260/028* (2013.01); *B32B 2260/046* (2013.01); *B32B 2262/0238* (2013.01); *B32B 2262/0253* (2013.01); *B32B 2262/0261* (2013.01); *B32B 2262/0276* (2013.01); *B32B 2262/0292* (2013.01); *B32B 2262/101* (2013.01); *B32B 2262/106* (2013.01); *B32B 2262/108* (2013.01); *B32B 2305/076* (2013.01); *B32B 2307/3065* (2013.01); *B32B 2307/718* (2013.01); *B32B 2307/732* (2013.01); *B32B 2329/00* (2013.01); *B32B 2331/00* (2013.01); *Y10T 428/26* (2015.01); *Y10T 428/27* (2015.01); *Y10T 428/31964* (2015.04)

(58) Field of Classification Search
CPC . B32B 29/06; B32B 2250/04; B32B 2250/03; B32B 2260/023; B32B 2307/732; B32B 2307/718; B32B 2262/0253; B32B 2262/0276; B32B 2262/0292; B32B 2262/0261; B32B 2262/101; B32B 2262/0238; B32B 2262/106; B32B 2262/108; B32B 2260/028; B32B 2260/046; B32B 2305/076; B32B 2307/3065; B32B 2329/00; B32B 2331/00; B32B 29/005; B32B 2262/0223; B32B 2264/104; B32B 2451/00; B32B 2264/102; B32B 2262/0246; B32B 1/00; Y10T 428/31964; Y10T 428/26; Y10T 428/27
See application file for complete search history.

(56) References Cited

FOREIGN PATENT DOCUMENTS

| | | | | |
|---|---|---|---|---|
| JP | H0858027 | A | 3/1996 | |
| JP | 2003225985 | A | 8/2003 | |
| JP | 4051459 | B2 | 2/2008 | |
| JP | 2008163508 | A | 7/2008 | |
| JP | 2010076358 | A | 4/2010 | |
| JP | 2015199346 | A * | 11/2015 | ............ B32B 27/08 |
| JP | 2015199346 | A | 11/2015 | |
| TW | 201600328 | A | 1/2016 | |

OTHER PUBLICATIONS

[NPL-2] Hayashi et al. (JP H08-058027A). Mar. 1996 (EPO machine translation to English). (Year: 1996).*
First Office Action for Chinese Patent Application No. 201780044676. 2, dated Aug. 31, 2020, 14 pages.
Notice of Reason(s) for Rejection for Japanese Patent Application No. 2017-142230 dated Nov. 21, 2017, 8 pages including English translation.
International Search Report (Form PCT/ISA/210) for International Application No. PCT/JP2017/026575 dated Oct. 10, 2017, 2 pages (English language).
Written Opinion (Form PCT/ISA/237) for International Application No. PCT/JP2017/026575 dated Oct. 10, 2017, 17 pages including English translation.
Notification of Transmittal of Translation of IPRP (Form PCT/IB/338), International Preliminary Report on Patentability (Form PCT/IB/373), and Translation of Written Opinion (Form PCT/ISA/237) for International Application No. PCT/JP2017/026575 dated Jan. 31, 2019, 13 pages.
Office Action for Indonesian Patent Application No. PID201901415, dated Feb. 18, 2021, 3 pages.
Examination Report for Indian Patent Application No. 201937005888. dated Mar. 8, 2021, 6 pages.
Office Action for Chinese Patent Application No. 201780044676.2 dated Apr. 23, 2021, 16 pages including English translation.
First Office Action for Taiwanese Patent Application No. 106124561, dated Jul. 26, 2021, 11 pages.

* cited by examiner

Embodiment 1

FIG. 4

Comparative Example 4

FIG. 5

DECORATIVE SHEET WITH ADHESIVE

CROSS-REFERENCE TO RELATED APPLICATIONS

This application is a 35 U.S.C. § 371 national phase filing of International Application No. PCT/JP2017/026575 filed on Jul. 21, 2017, and claims the benefit of Japanese Patent Application No. 2016-142952 filed on Jul. 21, 2016 with the Japan Patent Office, and the entire disclosures of International Application No. PCT/JP2017/026575 and Japanese Patent Application No. 2016-142952 are hereby incorporated in by reference herein in their respective entireties.

TECHNICAL FIELD

The present disclosure is related to a decorative plate, more specifically, a decorative sheet having an adhesive layer.

BACKGROUND ART

Conventionally, melamine decorative plate made by laminating materials such as melamine-resin-impregnated decorative paper and phenol-resin-impregnated paper have been used for desks, tables, counters and so on. In order to glue such melamine decorative plate to a base material such as a plywood, a particle board, medium-density fiberboard, the melamine decorative plate is coated with a glue, then pressed and bonded after drying. Therefore, there has been a problem that it takes long time to fix the melamine decorative plate to the base material, for example. To solve this problem, a decorative sheet provided with an adhesive layer on the back side is known. For example, Patent Document 1 discloses a decorative material provided with an adhesive on the back side of the decorative material.

PRIOR ART DOCUMENTS

Patent Documents

Patent Document 1: Japanese Utility Model Application Publication No. S63-192025

SUMMARY OF THE INVENTION

Problems to be Solved by the Invention

However, when a melamine decorative plate has an adhesive on the back side of the melamine decorative plate, a resin component of the adhesive melts under high temperature. This arises concerns that the shape of the melamine decorative plate may become difficult to be retained, and the melamine decorative-plate may become combustible.

In one aspect of the present disclosure, it is desirable to provide a new decorative sheet with adhesive, and the decorative sheet with adhesive is flame resistant and shape-retainable under high temperature.

Means for Solving the Problems

One aspect of the present disclosure provides a decorative sheet with adhesive, and the decorative sheet with adhesive comprises a decorative plate layer and an adhesive layer. The decorative plate layer comprises a decorative layer and a mixed paper layer which includes a magnesium silicate mixed paper with bound water.

Effects of the Invention

One aspect of the present disclosure provides a new decorative sheet with adhesive, which is flame resistant and shape-retainable under high temperature.

EXPLANATION OF REFERENCE NUMERALS

1 . . . decorative layer, 2 . . . balancing layer, 3 . . . core layer, 5 . . . adhesive layer, 6 . . . decorative plate layer 7 . . . decorative sheet with adhesive, 8 . . . decorative sheet with adhesive, 9 . . . decorative sheet with adhesive

MODE FOR CARRYING OUT THE INVENTION

A decorative sheet with adhesive (hereinafter, called a decorative sheet in this specification) in an embodiment of the present disclosure comprises a decorative plate layer and an adhesive layer. The decorative plate layer comprises a decorative layer and a mixed paper layer which includes a magnesium silicate mixed paper with bound water.

The adhesive layer contains a resin component, therefore, the adhesive layer is basically combustible or easy to melt under high temperature. However, the decorative sheet of the present embodiment comprises a mixed paper layer which has a magnesium silicate mixed paper with bound water. The magnesium silicate mixed paper has a self-extinguishing characteristic and inhibits flame from spreading. Accordingly, even when the decorative sheet of the present embodiment is exposed to high temperatures, the decorative sheet is flame resistant and the melting of the resin component is suppressed and the shape of the sheet can be maintained.

(A) Decorative Layer

In the present embodiment, examples of the decorative layer may include a resin-impregnated decorative paper obtained by impregnating a decorative paper with a thermosetting resin and drying. The decorative paper used for the decorative layer preferably has a design, for example. The thermosetting resin used for the decorative layer may be, for example, an amino-formaldehyde resin, a diallyl phthalate resin, an unsaturated polyester resin, or a mixture of these resins. The weight per unit area of the decorative paper used for the decorative layer is preferably 30 to 140 g/m². The decorative paper is preferably immersed with thermosetting resin so that an impregnation rate defined by Formula 1 is 80 to 300%.

[Formula 1]

$$\text{Impregnation rate \%} = \frac{\text{Weight after impregnation} - \text{Weight before impregnation}}{\text{Weight before impregnation}} \times 100 \quad \text{(Formula 1)}$$

(B) Core Layer

For a core layer, one or two or more prepreg containing fibrous base material is used. The each prepreg is preferably formed by impregnating the fibrous base material with a slurry containing a binder component and drying. Further, each prepreg is preferably formed by impregnating the fibrous base material with a slurry containing a binder component and endothermic metal hydroxide and drying.

Examples of the fibrous base material used for the prepreg may include an organic fiber base material and an inorganic fiber base material. Examples of the organic fiber base material may include a nonwoven fabric and woven fabric made from an organic fiber containing an organic component. Examples of the organic component contained in the organic fiber may include, for example, polyethylene, polypropylene, vinylon, polyvinyl chloride, polyvinylidene chloride, polyacrylonitrile, polyamide, polyester, polyurethane, or modifications of these substances; various copolymers represented by ethylene-vinyl acetate copolymers; or mixtures of these substances.

Examples of the inorganic fiber base material may include, for example, a nonwoven fabrics and a woven fabric made from an inorganic fiber containing an inorganic component. Examples of the inorganic component contained in the inorganic fiber may include, for example, glass fiber, rock wool, and carbon fiber.

In a case where the inorganic fiber base material is used, the non-combustibility of the decorative plate is further improved as compared to the case where the organic fiber base material is used. Especially, in a case where the nonwoven fabric containing the glass fiber is used among the inorganic fiber base material, the finished decorative plate can suppress its curling due to an absence of a fiber direction, and the finished decorative plate has further improved heat resistance, flame resistance, and slurry impregnation properties.

In each prepreg used for the core layer, the basis weight of the inorganic fiber base material is preferably in the range of 10 to 200 g/m².

Each prepreg, which forms the core layer, preferably further include a binder component in addition to the fibrous base material. The binder component comprises a thermoplastic resin, for example.

The binder component serves as a binding agent. The binder component bonds between materials which form each prepreg, between prepregs, and between the core layer formed by the prepreg and a layer adjacent to the core layer.

The thermoplastic resin is preferably used for the binder component, for example. The prepreg, which forms the core layer, preferably contains an acrylic resin emulsion. The acrylic resin emulsion is preferably used for the thermoplastic resin which serves as the binder component. In particular, the use of an acrylic resin emulsion having a glass transition temperature (Tg) of −20° C. or more is further preferable since such acrylic resin emulsion improves the close adhesion and the formability of the core layer. Among acrylic resin emulsions, the use of an acrylic resin emulsion having an average diameter of 150 to 300 nm is further preferable since such emulsion can further improve the binding force of the core layer, and the bending workability and the smoothness of the decorative plate. The reason for the improved smoothness is assumed to be that the acrylic resin emulsion consists of microparticles. The acrylic resin emulsion is obtained by emulsion polymerization or suspension polymerization using a (meth) acrylic acid ester as a main monomer in water. Examples of the monomer to be used may include esters such as methyl (meth)acrylate, ethyl (meth) acrylate, propyl (meth)acrylate, butyl (meth)acrylate, and hydroxyethyl (meth)acrylate. In addition to these monomers, other polymerizable monomers and multifunctional monomers may be copolymerized.

The average diameter is a value calculated with a laser beam diffraction/scattering particle diameter measuring device (ELS-8000 manufactured by Otsuka Electronics Co., Ltd.) based on scattered light detected at the time of laser irradiation.

In the prepreg, the blending ratio of the thermoplastic resin in the slurry impregnated to the fibrous base material is preferably 3 to 17% by mass in solid equivalent. Blending the upper limit or less of the thermoplastic resin further improves non-combustibility of the decorative sheet and reduces an occurrence of exudation of the synthetic resin from the prepreg while the decorative sheet is formed under heat and pressure. Blending the lower limit or more of the thermoplastic resin further improves the close adhesion between the prepregs and allows easier control over the amount of impregnation of the fibrous base material with the slurry.

In a case where the amount of the thermoplastic resin in the core layer is a value calculated from the weight of the thermoplastic resin contained in the core layer per unit area, the amount of the thermoplastic resin in the core layer is preferably 10 to 100 g/m². Containing 100 g/m² or less amount of the thermoplastic resin further improves the non-combustibility of the decorative plate. Containing 100 g/m² or less amount of the thermoplastic resin reduces an occurrence of exudation of thermoplastic resin while the decorative sheet is formed under heat and pressure.

Containing 10 g/m² or more amount of the thermoplastic resin in the core layer further improves the close adhesion between the prepregs which constitute the core layer. Containing 10 g/m² or more amount of the thermoplastic resin also allows easier control over the impregnation amount of the slurry in a case where the fibrous base material is impregnated with the slurry to produce the core layer.

The prepreg which constitutes the core layer preferably further includes an endothermic metal hydroxide in the fibrous base material in addition to the above-described binder component.

The endothermic metal hydroxide is a metal hydroxide that may generate endothermic reaction. Many endothermic metal hydroxides contain crystal water. The endothermic metal hydroxide is decomposed at high temperature and releases water. Since this reaction of the endothermic metal hydroxide is the endothermic reaction, endothermic metal hydroxide provides an effect of suppressing a temperature rise during combustion. Since the core layer includes the endothermic metal hydroxide, non-combustibility of the decorative sheet improves in the present embodiment.

Examples of the endothermic metal hydroxide include aluminum hydroxide, magnesium hydroxide, and calcium hydroxide. In particular, aluminum hydroxide and magnesium hydroxide are preferably used. The blending ratio of the endothermic metal hydroxide in slurry is preferably 20 to 95% by mass relative to 100% by mass of the solid content of the slurry that is impregnated into the fibrous base material. This blending ratio allows the decorative plate to have good close adhesion and non-combustibility.

The average diameter of the endothermic metal hydroxide may be in the range of 1 to 50 µm, for example. This average diameter is an arithmetic average diameter calculated from the particle size distribution (volume distribution) detected by a laser beam diffraction/scattering method (Microtrac method). Due to the average diameter of the endothermic metal hydroxide being in the above-specified range, the dispersibility of the endothermic metal hydroxide in the slurry improves, and thus the impregnation properties of the slurry into the fibrous base material improves. Moreover, the surface of the decorative plate has a smooth finish.

The amount of endothermic metal hydroxide in the core layer preferably falls within a range of 50 to 600 $g/m^2$ when the amount of the endothermic metal hydroxide in the core layer is calculated from the weight of the endothermic hydroxide contained in the core layer per unit area. With this range of endothermic metal hydroxide, the close adhesion between the prepregs which constitute the core layer improves and the non-combustibility of the decorative sheet also improves.

The slurry to be used in the core layer may additionally contain an inorganic filler other than endothermic metal hydroxide, a silane coupling agent, flame retardant, and the like.

Examples of the inorganic filler other than the endothermic metal hydroxide include carbonates such as calcium carbonate, magnesium carbonate, zinc carbonate, silica, talc, and fly ash. In a case where the average diameter of the inorganic filler is a value calculated from the arithmetic average diameter calculated from the particle size distribution (volume distribution) detected by the laser beam diffraction/scattering method (Microtrac method), the average diameter of the inorganic filler may be in the range of 0.05 to 20 µm, for example. In this case, impregnation properties of the slurry into the fibrous base material further improves.

Among the inorganic fillers, particularly carbonate, for example, calcium carbonate may be preferably selected. In this case, workability and machinability of the decorative sheet in the production process further improves. Examples of calcium carbonate to be used may include heavy calcium carbonate and light calcium carbonate (precipitated calcium carbonate). The average diameter of the calcium carbonate may be, for example, 0.05 to 10 µm, and more preferably 0.1 to 5 µm. The average diameter of calcium carbonate being 0.05 µm or more causes less agglomeration of calcium carbonate in the slurry, thus improves the impregnation properties of the slurry into the fibrous base material. The average diameter of calcium carbonate being 10 µm or less provides the decorative plate with a smoother surface, thus improves the appearance.

Light calcium carbonate means calcium carbonate chemically produced by calcining limestone. Heavy calcium carbonate means pulverized calcium carbonate produced by dry or wet grinding white crystalline limestone.

The blending ratio of the endothermic metal hydroxide in total inorganic filler contained in the prepreg which constitutes the core layer may be 30 to 100% by mass. The blending ratio being within this range further improves the non-combustibility and the machinability of both the decorative plate before an adhesive layer is provided and the decorative sheet.

In the decorative sheet of the present embodiment, the slurry impregnated into the fibrous base material to produce the prepreg which constitutes the core layer may contain a silane coupling agent. In this case, the slurry containing the silane coupling agent provides a lower weight increase rate of the prepreg and the further improved close adhesion between the prepreg and the mixed paper layer as compared with a slurry without silane coupling agent, in terms of boiling resistance in accordance with the Japanese Industrial Standards (JIS) K-6902 "Testing method for laminated thermosetting high-pressure decorative sheets". The blending ratio of the silane coupling agent in the total slurry content contained in the prepreg which constitutes the core layer is in the range 0.1 to 10% by mass in solid equivalent.

Examples of the silane coupling agent include (meth) acryloyloxy group-containing silane such as 3-(meth)acryloyloxypropyl trimethoxysilane and 3-(meth)acryloyloxypropyl triethoxysilane; vinyl group-containing silane such as vinyl trimethoxysilane and vinyl triethoxysilane; epoxy group-containing silane such as 3-glycidoxypropyl trimethoxysilane, 3-glycidoxypropyl methyl dimethoxysilane, and 3-glycidoxypropyl triethoxysilane; styryl group-containing silane such as p-styryl trimethoxysilane; amino group-containing silane such as 3-aminopropyl trimethoxysilane, 3-aminopropyl triethoxysilane, 3-(2-aminoethyl) aminopropyl trimethoxysilane, and 3-phenyl aminopropyl trimethoxysilane; and mercapto group-containing silane such as 3-mercaptopropyl trimethoxysilane, 3-mercaptopropyl triethoxysilane, and 3-mercaptopropyl methyl dimethoxysilane. In particular, the use of epoxy group-containing silane or amino group-containing silane further improves the crosslinking density of the prepreg.

In a case where the amount of the silane coupling agent contained in the core layer is a value calculated from the weight of the silane coupling agent contained in the core layer per unit area, the amount of the silane coupling agent is preferably in the range of 1 to 20 $g/m^2$. The amount of the silane coupling agent being within this range makes the above-described effect of the silane coupling agent further prominent.

The core layer may preferably contain a flame retardant. The flame retardant is used by contained in the slurry to form the prepreg.

Preferable examples of the flame retardant to be used may include phosphorus flame retardant, nitrogen flame retardant, and phosphorus-nitrogen flame retardant. Examples of the phosphorus flame retardant may include an ester phosphate, a phosphorus-containing polyol and a phosphorus-containing amine. Examples of the nitrogen flame retardant may include a melamine cyanurate, a triazine compound, and a guanidine compound. Examples of the phosphorus-nitrogen flame retardant may include a guanidine phosphate and guanylurea phosphate. The phosphorus-nitrogen flame retardant is a compound having the functions of both the phosphorus flame retardant and the nitrogen flame retardant and contains both phosphorus atoms and nitrogen atoms in a single molecule. When the phosphorus-nitrogen flame retardant is exposed to high temperatures, phosphorus blocks oxygen by its strong dehydrating action and nitrogen produces ammonia gas and the like to block oxygen. Because of these actions, the phosphorus-nitrogen flame retardant improves heat-insulating and flame-retardant effects, which makes the prepreg flame resistant. The ratio of the total nitrogen content in the flame retardant is preferably 1 to 50% by mass. The blending ratio of the flame retardant in the total slurry is in the range of 0.1 to 15% by mass in solid equivalent. In a case where the thermosetting resin contained in the decorative layer is an amino-formaldehyde resin, in particular, a melamine-formaldehyde resin, the flame retardant, which may be contained in the core layer, is preferably the nitrogen flame retardant. This is because the adhesive strength between the core layer and the decorative layer improves.

The amount of the flame retardant is preferably in the range of 1 to 100 g/m$^2$ in a case where the amount of the flame retardant in the core layer is a value calculated from the weight of the flame retardant contained in the core layer per unit area. The amount of the flame retardant being within this range makes the above-described effect of the flame retardant further prominent.

When the fibrous base material is impregnated with the slurry to obtain the core layer, it is preferable that the fibrous base material is impregnated so that the impregnation rate calculated by the method defined in Formula 1 falls in the range of 500 to 1200% and then dried. The impregnation rate of 1200% or less can suppress fall-off of the solid content of the slurry from the prepreg and thus makes the prepreg easy to handle. The impregnation rate of 500% or more causes less separation between the layers of the prepreg.

(C) Mixed Paper Layer

In the present embodiment, the mixed paper layer includes a magnesium silicate mixed paper with bound water. The magnesium silicate mixed paper with bound water is a mixed paper containing magnesium silicate compounds having bound water. Examples of the magnesium silicate mixed paper may include a mixed paper formed by mixing and papermaking the magnesium silicate compounds having bound water and pulp.

Examples of the magnesium silicate compounds with bound water may include hydrous magnesium silicate [$Mg_8Si_{12}O_{30}(OH_2)_4(OH)_4 6—8H_2O$] (sepiolite), hydrous magnesium silicate [$Mg_3Si_4O_{10}(OH)_2$] (talc), hydrous magnesium silicate aluminum [$Mg_5Si_8O_{20}(OH)_2(H_2O)_4 \cdot 4H_2O$] (attapulgite), and hydrous magnesium silicate aluminum [$(Mg, Fe, Al)_3(Al, Si)_4O_{10}(OH)_2 \cdot 4H_2O$] (vermiculite). In particular, sepiolite is preferable with its excellent non-combustibility and water resisting property.

The amount of the magnesium silicate compounds contained in the magnesium silicate mixed paper is preferably 40 to 95% by mass and more preferably 55 to 85% by mass relative to 100% by mass of the magnesium silicate mixed paper. In a case where the amount of the magnesium silicate compounds contained in the magnesium silicate mixed paper is less than 40% by mass, the non-combustibility of the magnesium silicate mixed paper is likely to be deteriorated. In a case where the amount of the magnesium silicate compounds is more than 95% by mass, there is a concern that the paper strength such as a tensile strength of the magnesium silicate mixed paper is likely to be deteriorated.

In the present embodiment, the mixed paper layer includes the magnesium silicate mixed paper as the base material. The mixed paper layer is a thermosetting-resin-impregnated paper made by impregnating the magnesium silicate mixed paper with the resin liquid composed mainly of the thermosetting resin and drying the impregnated base material. Alternatively, the mixed paper layer is a flame retardant impregnate paper made by impregnating the magnesium silicate mixed paper with the flame retardant and drying. The use of the thermosetting-resin-impregnated paper or the flame retardant impregnate paper makes the decorative plate excellent in balance and suppresses curling of the finished decorative plate. The fibrous base material used for the thermosetting-resin-impregnated paper or the flame retardant impregnate paper preferably has heat resistance.

Examples of the thermosetting resin used for the thermosetting-resin-impregnated paper may include an amino-formaldehyde resin, a phenol-aldehyde resin, and a vinyl ester resin.

The amino-formaldehyde resin can be obtained by condensation between an amino compound such as melamine, urea, acetoguanamine, benzoguanamine and the like, and formaldehyde.

The phenol-aldehyde resin can be obtained by a reaction of phenols and aldehydes under a basic catalyst in the ratio of 1 to 1.3 mol of aldehydes to 1 mol of phenolic hydroxyl group. Examples of the phenols may include phenol, cresol, xylenol, octylphenol, phenylphenol, bisphenol A, bisphenol S, and bisphenol F.

Examples of the aldehydes may include formaldehyde, paraformaldehyde, and glyoxal.

The phenol-aldehyde resin may be, as required, a denatured phenol-aldehyde resin, which has been denatured with a denaturant that facilitates plasticization, such as para-sulfonamide, tung oil, a ester phosphates, or glycols.

Examples of the basic catalyst may include alkali metal such as sodium and potassium, and alkaline-earth metal oxide such as magnesium and calcium and alkaline-earth metal hydroxide such as magnesium and calcium. Examples of other basic catalyst include amines such as triethylamine and triethanolamine, and ammonia.

The vinyl ester resin can be obtained by a reaction of an epoxy resin and unsaturated monobasic acid with an esterification catalyst. Examples of the epoxy resin may include a bisphenol A epoxy resin, a halogenated bisphenol A epoxy resin, a diglycidyl ether that is an adduct of bisphenol A and alkylene oxide such as ethylene oxide or propylene oxide, a bisphenol F epoxy resin, a novolac epoxy resin, and a cresol novolac epoxy resin.

Examples of the unsaturated monobasic acid may include acrylic acid, methacrylic acid, crotonic acid, monomethyl maleate, monopropyl maleate, sorbic acid and mono (2-ethylhexyl) maleate, and polybasic acid may be used with unsaturated monobasic acid. Examples of polybasic acid used with unsaturated monobasic acid may include succinic acid, maleic acid, fumaric acid, itaconic acid, phthalic acid, isophthalic acid, terephthalic acid, adipic acid, azelaic acid, and 1, 12-dodecanedioic acid in addition to dimer acid.

Examples of the esterification catalyst include tertiary amines such as dimethylbenzylamine and tributylamine; quaternary ammonium salt such as trimethylbenzil ammonium chloride; inorganic salt such as lithium chloride and chromium chloride; imidazole compound such as 2-ethyl-4-methylimidazole; phosphonium salt such as tetramethyl-phosphonium chloride, diethyl-phenyl-propyl-pho sphonium chloride, triethyl-phenyl-phosphonium chloride, benzil triethyl-phenyl-phosphonium chloride, dibenzil ethyl-methyl-phosphonium chloride, benzil-methyl-diphenyl-phosphonium chloride, tetraphenylpho sphonium bromide; secondary amines; tetrabutylurea; triphenylphosphine; tritolylphosphine; triphenylstibine.

In a case where the magnesium silicate mixed paper is impregnated with the flame retardant at the time of forming the mixed paper layer, the flame retardant similar to the one used for the core layer may be used. The mixed paper layer preferably contains the flame retardant, in particular, the nitrogen flame retardant or the phosphorus-nitrogen flame retardant is preferable.

Examples of the phosphorus flame retardant may include an ester phosphate, a phosphorus-containing polyol, and a phosphorus-containing amine. Examples of the nitrogen flame retardant may include a melamine cyanurate, a triazine compound, and a guanidine compound. Examples of the phosphorus-nitrogen flame retardant may include a guanidine phosphate and a guanylurea phosphate. The phosphorus-nitrogen flame retardant is a compound having the functions of both the phosphorus flame retardant and the nitrogen flame retardant and contains both phosphorus atoms and nitrogen atoms in a single molecule. When the phosphorus-nitrogen flame retardant is exposed to high temperatures, phosphorus blocks oxygen by its strong dehydrating action and nitrogen produces ammonia gas and the like to block oxygen. Because of these actions, the phosphorus-nitrogen flame retardant improves heat-insulating and flame-retardant effects, which makes the prepreg flame resistant. The ratio of the total nitrogen content in the flame retardant is preferably 1 to 50% by mass. The blending ratio of the flame retardant in the total slurry content is preferably in the range of 0.1 to 15% by mass in solid equivalent. In a case where the thermosetting resin contained in the decorative layer is an amino-formaldehyde resin, in particular, a melamine-formaldehyde resin, the flame retardant, which may be contained in the core layer, is preferably the nitrogen flame retardant. This is because the adhesive strength between the core layer and the decorative layer improves.

In a case where the amount of the thermosetting resin, or the nitrogen flame retardant or the phosphorus-nitrogen flame retardant contained in the mixed paper layer is a value calculated from the weight of the thermosetting resin, or the nitrogen flame retardant or the thermosetting resin in the mixed paper layer per unit area, the amount of the thermosetting resin, or the nitrogen flame retardant or the phosphorus-nitrogen flame retardant contained is in the range of 9 to 90 g/m$^2$. The amount being within this range can suppress curling of the decorative sheet and can make the decorative sheet excellent in flexibility. Among the thermosetting resins, the use of the vinyl ester resin is preferable since the vinyl ester resin improves the bending workability. Note that the contained amount is a value in solid equivalent.

The magnesium silicate mixed paper can be produced by preparing a slurry which includes pulp and magnesium silicate compounds with bound water for a papermaking, and dehydrating and drying the paper. To the slurry used for the production of the magnesium silicate mixed paper, for example, an aggregate binder, a chemical agent, organic fibers, inorganic fibers, or fixing agent may be added. As a papermaking machine used for making the paper from the slurry, a cylinder paper machine, a multi-cylinder Fourdrinier paper machine, a Fourdrinier-cylinder combination paper machine, an inclined paper machine or the like may be used. The basis weight of the magnesium silicate mixed paper is preferably 60 to 400 g/m$^2$. The obtained magnesium silicate mixed paper has a self-extinguishing characteristic and thus can inhibit flame from spreading. Examples of the pulp may include natural pulp such as wood pulp, cotton pulp, and plant fiber pulp. In particular, use of chemical pulp made by chemically treating wood pulp having short fiber length such as broad-leaved tree bleached Kraft pulp, needle-leaved tree Kraft pulp and the like is preferable so as to improve the paper strength and impregnation properties of the mixed paper. The broad-leaved tree bleached Kraft pulp and the needle-leaved tree Kraft pulp may be used together. The pulp may be bleached or non-bleached.

The adhesive layer contains an adhesive. The adhesive layer may comprise a release paper in addition to the adhesive. The surface of the adhesive may be covered with the release paper. Examples of the adhesive may include an acrylic adhesive containing acrylic polymers and a tackifier; and solvent rubber-based adhesive containing styrene-butadiene. Examples of monomers forming the acrylic polymer contained in the acrylic adhesive may include (meth)acrylic acid alkyl ester such as methyl (meth)acrylate, ethyl (meth)acrylate, (meth)acrylic acid n-propyl, and butyl (meth)acrylate. Here, (meth)acrylic acid means methacrylic acid or acrylic acid. Examples of the tackifier may include a rosin-based tackifier, a terpene-based tackifier, a phenol-based tackifier, and a coumarone-based tackifier. As the release paper, known release paper with a silicone release agent being applied thereon is used. The thickness of the adhesive layer is preferably 50 to 180 μm. Within this range, the adhesive layer exert its adhesive strength.

The decorative sheet in the present embodiment comprises the decorative plate layer and the adhesive layer disposed on the back side of the decorative plate layer. The decorative plate layer comprises the decorative layer and the mixed paper layer. The decorative plate layer may comprise only the decorative layer and the mixed paper layer. The mixed paper layer is preferably disposed on the back side of the decorative layer.

In the present embodiment, The decorative plate layer preferably comprises (A) decorative layer, (B) a core layer made of a prepreg containing a fibrous base material, and (C) a mixed paper layer. In this case, (C) the mixed paper layer is preferably a balancing layer. The balancing layer improves the smoothness of the decorative plate layer and suppresses curling of the decorative plate layer. The decorative layer is made from relatively hard materials, and the core layer is made from relatively soft materials. The balancing layer preferably has a medium hardness as compared to the decorative layer and the core layer. In this case, curling of the decorative sheet can be suppressed. The mixed paper layer uses a paper as the base material, thus in a case where the core layer comprises glass fibers as the fibrous base material, the mixed paper layer included in the decorative sheet can improve the surface smoothness of the decorative sheet. The balancing layer exerts the effects of the surface smoothness and curling suppression of the decorative sheet in both cases: where the decorative plate layer comprises (A) the decorative layer and (C) the balancing layer, where the decorative plate layer comprises (A) the decorative layer, (B) the core layer, and (C) the balancing layer in this order; and where the decorative plate layer comprises (A) the decorative layer, (C) the balancing layer, and (B) the core layer in this order.

The decorative layer preferably has the thickness of 0.05 mm to 0.15 mm. When the decorative layer has the thickness of 0.05 mm to 0.15 mm, the thickness of other layers except for the decorative layer in the decorative plate layer, which is the total thickness of the mixed paper layer and the core layer as necessary, is preferably more than 0.15 mm and 1.8 mm or less, and more preferably 0.2 mm or more and 1.3 mm or less. The decorative layer contains the relatively hard thermosetting resin. In a case where the decorative layer receives deformation force such as shrinkage stress under heat or humidity, the mixed paper layer and the core layer as necessary serve to suppress the deformation of the decorative layer with their own thickness, and thus the deformation such as curling of decorative sheet can be suppressed.

The above-described decorative sheet is preferably produced by stacking the decorative layer, the mixed paper layer, and the core layer, and then heating and pressing the stacked layers with a pressing machine such as a flat press machine or continuous press machine.

The adhesive layer is provided on the back side of the decorative plate layer by pressing and laminating the adhesive layer on the back side of the decorative plate layer after the decorative plate layer is produced.

Figure 1:
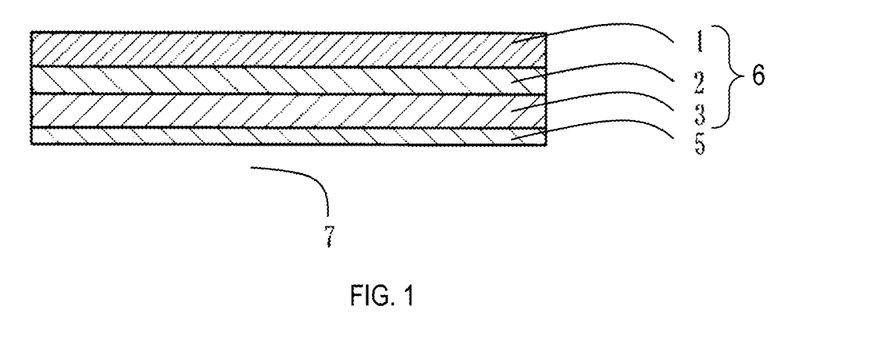
FIG. 1 is a sectional view showing a structure of a decorative sheet with adhesive in one embodiment of the present disclosure.

As shown in FIG. 1, the decorative sheet 7 in the present embodiment comprises a decorative plate layer 6, an adhesive layer 5 disposed on the back side of the decorative plate layer 6. The decorative plate layer 6 is preferably formed by stacking (B) a core layer 3, (C) a balancing layer 2, and (A) a decorative layer 1 in this order from the bottom. In such stacking structure of the decorative plate layer 6, the color of the material included in (B) the core layer 3 is less likely to appear on the surface of the decorative plate layer 6, which results in an advantage of excellent smoothness.

Figure 2:
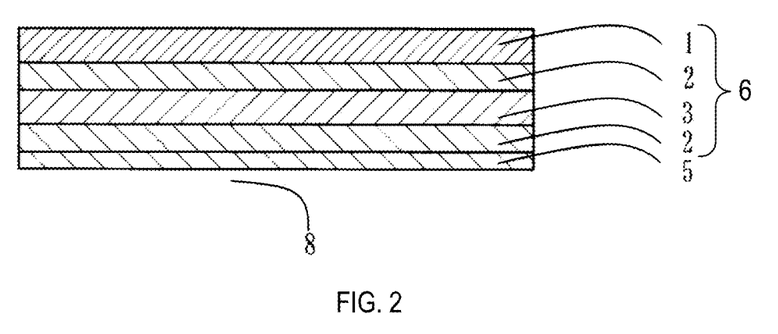
FIG. 2 is a sectional view showing a structure of a decorative sheet with adhesive in another embodiment of the present disclosure.

As shown in FIG. 2, the decorative plate layer 6 is preferably formed by stacking (C) the balancing layer 2, (B) the core layer 3, (C) the balancing layer 2, and (A) the decorative layer 1 in this order from the bottom. In this case, the bending workability is slightly worsened due to the thicker thickness of the decorative sheet 8; however, the handling ability thereof improves and the decorative sheet 8 is less likely to be damaged in its use.

Figure 3:
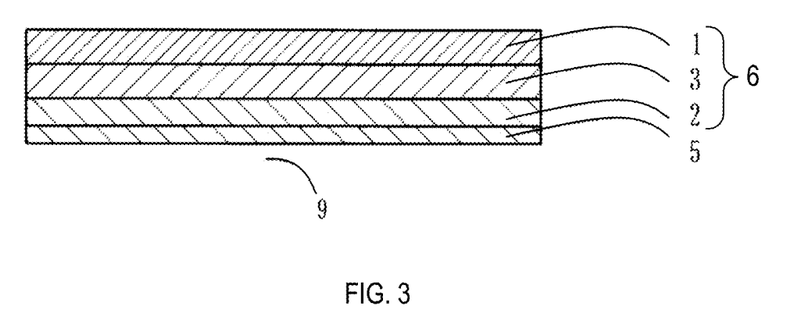
FIG. 3 is a sectional view showing a structure of a decorative sheet with adhesive in another embodiment of the present disclosure.

As shown in FIG. 3, the decorative plate layer 6 may be formed by stacking (C) the balancing layer 2, (B) the core layer 3, and (A) the decorative layer 1 in this order from the bottom.

The thickness of the decorative sheet in the present embodiment is preferably 0.2 to 2.0 mm. Within this range of the thickness, curling of the decorative sheet can be further suppressed. In particular, in a case where the thickness of the decorative sheet is 0.2 to 0.8 mm, the decorative sheet excels in bending workability under normal temperature.

The present disclosure will be described in a detailed manner hereinafter in Embodiments and Comparative Examples.

Embodiment 1

(A) Decorative Layer (Melamine Resin Impregnated Patterned Paper)

Wood-pattern-printed decorative paper having the basis weight of 100 g/m² was impregnated with resin liquid composed mainly of the melamine-formaldehyde resin so that the impregnation rate defined in Formula 1 became 130%. The resultant was dried to produce the patterned paper impregnated with the melamine resin.

(B) Core Layer

Production of Glass Fiber Fabric-Based Prepreg
(The Values Indicated by Parts by Mass Show Values in Solid Equivalent)

The following components were mixed:
as a binder, 32 parts by mass of the acrylic resin emulsion (Product No. RAX-208, manufactured by Aica Kogyo Co., Ltd), which has a glass transition temperature (Tg) of 60° C. and contains 2-ethylhexyl acrylate and methyl methacrylate as the main monomers with an average diameter of 200 nm;
as endothermic metal hydroxide, 300 parts by mass of aluminum hydroxide having an average diameter of 8 μm;
as a silane coupling agent, 2.7 parts by mass of 3-glycidoxypropyl trimethoxysilane; and
as a flame retardant, 29 parts by mass of the guanidine phosphate (APINON 303, manufactured by Sanwa Chemical Co., Ltd, accounts for 39% of the total nitrogen contents).

Water was added to this mixture to obtain the slurry. A glass fiber nonwoven fabric having the basis weight of 40 g/m² was used as the fibrous base material. The glass fiber nonwoven fabric was impregnated with the slurry so that the impregnation rate defined in Formula 1 became 850%. The resultant was dried to produce the glass fiber fabric-based prepreg.

(C) Balancing Layer (Mixed Paper Layer)

Magnesium silicate mixed paper (Product name: GP-18, manufactured by TIGEREX Co. Ltd., hydrous magnesium silicate (sepiolite) 80% by mass, pulp 10% by mass, glass fiber 5% by mass, and organic binder 5% by mass) having the basis weight of 180 g/m² was used. The magnesium silicate mixed paper was impregnated with a flame retardant which is guanidine phosphate (APINON 307, manufactured by Sanwa Chemical Co., Ltd., accounts for 31% of the total nitrogen contents) so that the impregnation rate defined in Formula 1 became 20% (36 g/m² per unit area). The resultant was dried to produce the guanidine phosphate impregnated mixed paper.

Production of Decorative Sheet (With Adhesive)

One sheet of the glass fiber fabric-based prepreg as (B) a core layer, one sheet of the guanidine phosphate impregnated mixed paper as (C) a balancing layer, and one sheet of melamine resin impregnated patterned paper as (A) a decorative layer were stacked in this order from the bottom. Subsequently, heat and pressure were applied to the stack of sheets with a flat press machine under the conditions of temperature 132° C. and pressure 70 kgf/cm² for 64 minutes to form the decorative plate with a thickness of 0.48 mm. An adhesive sheet (manufactured by Nichiei Kakoh Co., Ltd.) which was made by applying the acrylic adhesive composed mainly of acrylic resin on a silicone release paper and had the thickness of 136 μm was prepared. The adhesive sheet was stacked on the core layer side (back side) of the decorative plate to form the decorative sheet.

Embodiment 2

The production of the decorative sheet of Embodiment 2 was basically the same as that of Embodiment 1 except that a sheet of vinyl ester resin impregnated mixed paper, which was made by impregnating with resin liquid composed mainly of vinyl ester resin and drying, was used for the balancing layer instead of the guanidine phosphate impregnated mixed paper used in Example 1.

The composition of the resin liquid composed mainly of vinyl ester resin was 61-65% of a bisphenol vinyl ester, 13-17% of methacrylic monomer, 20% of propylene glycol monomethyl ether acetate (diluent), and 2% of acrylic acid.

Embodiment 3

The decorative sheet of Embodiment 3 was basically the same as that of Embodiment 1 except that the thickness of the acrylic adhesive sheet (manufactured by Nichiei Kakoh Co., Ltd.) used for the adhesive layer was 80 μm.

Embodiment 4

The decorative sheet of Embodiment 4 was basically the same as that of Embodiment 1 except that the thickness of the acrylic adhesive sheet (manufactured by Nichiei Kakoh Co., Ltd.) used for the adhesive layer was 50 μm.

Embodiment 5

The production of the decorative sheet of Embodiment 5 was basically the same as that of Embodiment 1 except that an adhesive sheet which was made by applying a solvent rubber-based adhesive (styrene-isoprene block copolymer) and had the thickness of 140 μm (manufactured by Nichiei Kakoh Co., Ltd.) was used for the adhesive layer instead of the adhesive sheet of Embodiment 1, which was made by applying the acrylic adhesive and had the thickness of 136 μm.

Embodiment 6

The decorative sheet of Embodiment 6 was basically the same as that of Embodiment 1 except that a magnesium silicate mixed paper of 120 g/m$^2$ (Product name: GP-12, manufactured by TIGEREX Co. Ltd., hydrous magnesium silicate (sepiolite) 80% by mass, pulp 10% by mass, glass fiber 5% by mass, and organic binder 5% by mass) was used for the balancing layer instead of the magnesium silicate mixed paper of 180 g/m$^2$ used in Embodiment 1.

Embodiment 7

The decorative sheet of Embodiment 7 was basically the same as that of Embodiment 1 except that a magnesium silicate mixed paper of 350 g/m$^2$ (Product name: GP-35, manufactured by TIGEREX Co. Ltd., hydrous magnesium silicate (sepiolite) 80% by mass, pulp 10% by mass, glass fiber 5% by mass, and organic binder 5% by mass) is used for the balancing layer instead of the magnesium silicate mixed paper of 180 g/m$^2$ used in Embodiment 1.

Embodiment 8

The decorative sheet of Embodiment 8 was basically the same as that of Embodiment 1 except that the stacking structure of the decorative plate layer was the structure in which (C) the balancing layer, (B) the core layer, and (A) the decorative layer were stacked in this order from the bottom.

Embodiment 9

The decorative sheet of Embodiment 9 was basically the same as that of Embodiment 1 except that the stacking structure of the decorative plate layer was a structure in which (C) the balancing layer, (B) the core layer, (C) the balancing layer, and (A) the decorative layer were stacked in this order from the bottom. In this embodiment, the two (C) balancing layers were the same as (C) the balancing layer used in Embodiment 1.

Embodiment 10

The production of the decorative sheet of Embodiment 10 was basically the same as that of Embodiment 1 except that the blended amount of the acrylic resin emulsion (Product No. RAX-208, manufactured by Aica Kogyo Co., Ltd.), which was a binder component contained in the slurry to form the core layer, was 17 parts by mass.

Embodiment 11

The production of the decorative sheet of Embodiment 11 was basically the same as that of Embodiment 1 except that the blended amount of the acrylic resin emulsion (Product No. RAX-208, manufactured by Aica Kogyo Co., Ltd), which was a binder component contained in the slurry to form the core layer, was 58 parts by mass.

Embodiment 12

The production of the decorative sheet of Embodiment 12 was basically the same as that of Embodiment 1 except that 32 parts by mass of the acrylic resin emulsion (Product No. CMX-43, manufactured by Aica Kogyo Co., Ltd), which had the glass transition temperature (Tg) of −20° C. and contained butyl acrylate and methyl methacrylate as the main monomers with an average diameter of 230 nm, was used instead of the acrylic resin emulsion (Product No. RAX-208, manufactured by Aica Kogyo Co., Ltd.), which was used as a binder component contained in the slurry to form the core layer in Embodiment 1.

Embodiment 13

The production of the decorative sheet of Embodiment 13 was basically the same as that of Embodiment 1 except that 32 parts by mass of the acrylic resin emulsion (Product No. ANX-150, manufactured by Aica Kogyo Co., Ltd), which had the glass transition temperature (Tg) of 47° C. and contained ethyl acrylate and methyl methacrylate as the main monomers with an average diameter of 225 nm, was used instead of the acrylic resin emulsion (Product No. RAX-208, manufactured by Aica Kogyo Co., Ltd.), which was used as a binder component contained in the slurry to form the core layer in Embodiment 1.

Embodiment 14

The production of the decorative sheet of Embodiment 14 was basically the same as that of Embodiment 1 except that the blended amount of aluminum hydroxide contained in slurry to form the core layer was 600 parts by mass.

Embodiment 15

The production of the decorative sheet of Embodiment 15 was basically the same as that of Embodiment 1 except that blended amount of aluminum hydroxide contained in the slurry to form the core layer was 100 parts by mass, and as the inorganic filler other than the endothermic metal hydroxide, heavy calcium carbonate with the average diameter of 1 μm was further added 100 parts by mass to the slurry to form the core layer.

Embodiment 16

The production of the decorative sheet of Embodiment 16 was basically the same as that of Embodiment 1 except that the blended amount of 3-glycidoxypropyl trimethoxysilane (silane coupling agent) contained in the slurry to form the core layer was 1.8 parts by mass.

Embodiment 17

The production of the decorative sheet of Embodiment 17 was basically the same as that of Embodiment 1 except that the blended amount of 3-glycidoxypropyl trimethoxysilane contained in the slurry to form the core layer was 18 parts by mass.

Embodiment 18

The production of the decorative sheet of Embodiment 18 was basically the same as that of Embodiment 1 except that the blended amount of guanidine phosphate (flame retardant) contained in the slurry to form the core layer was 3.5 parts by mass.

Embodiment 19

The production of the decorative sheet of Embodiment 19 was basically the same as that of Embodiment 1 except that the blended amount of guanidine phosphate contained in the slurry to form the core layer was 35 parts by mass.

Embodiment 20

The production of the decorative sheet of Embodiment 20 was basically the same as that of Embodiment 1 except that 3-aminopropyl trimethoxysilane was used as the silane coupling agent to form the core layer, instead of 3-glycidoxypropyl trimethoxysilane used in Embodiment 1. In Embodiment 20, the blended amount of the silane coupling agent contained in the prepreg to form the core layer was the same as that of Embodiment 1.

Embodiment 21

The production of the decorative sheet in Embodiment 21 was basically the same as that of Embodiment 1 except that the guanylurea phosphate was used instead of guanidine phosphate which was used as the phosphorus-nitrogen flame retardant to form the core layer in Embodiment 1. The guanylurea phosphate was APINON-405 (Product name) manufactured by Sanwa Chemical Co., Ltd. The guanylurea phosphate accounts for 28% of the total nitrogen. In Embodiment 21, the blended amount of guanylurea flame retardant contained in the prepreg to form the core layer is the same as that of Embodiment 1.

Embodiment 22

The production of the decorative sheet in Embodiment 22 was basically the same as that of Embodiment 1 except that the impregnation rate of the guanidine phosphate to form the balancing layer was 5%.

Embodiment 23

The production of the decorative sheet in Embodiment 23 was basically the same as that of Embodiment 1 except that the impregnation rate of the guanidine phosphate to form the balancing layer was 50%.

Embodiment 24

The production of the decorative sheet in Embodiment 24 was basically the same as that of Embodiment 1 except that an impregnated resin composed mainly of the melamine resin was used instead of the guanidine phosphate used as the impregnated resin to form the balancing layer in Embodiment 1.

Embodiment 25

The production of the decorative sheet in Embodiment 25 was basically the same as that of Embodiment 1 except that an impregnated resin composed mainly of the phenol resin was used instead of the guanidine phosphate used as the impregnated resin to form the balancing layer in Embodiment 1.

Embodiment 26

The decorative sheet in Embodiment 26 was basically the same as that of Embodiment 1 except for having a stacking structure in which (C) the balancing layer, (C) the balancing layer, and (A) the decorative layer were stacked in this order from the bottom. The two balancing layers were the same and the sepiolite mixed paper similar to the one used in Embodiment 1 were used.

Embodiment 27

The decorative sheet of Embodiment 26 was basically the same as that of Embodiment 1 except for having a stacking structure in which (C) the balancing layer and (A) the decorative layer were stacked in this order from the bottom.

COMPARATIVE EXAMPLE 1

The production of Comparative Example 1 was basically the same as that of Embodiment 2 except that aluminum hydroxide mixed paper (Product name: Sanwall, manufactured by Sanzen Paper Manufacturing Co., Ltd., the mixing ratio of aluminum hydroxide was 69% by mass) of 110 g/m$^2$ was used instead of the magnesium silicate mixed paper of 180 g/m$^2$ which was used in Embodiment 2 as the fibrous base material to form the balancing layer.

COMPARATIVE EXAMPLE 2

The production of Comparative Example 2 was basically the same as that of Embodiment 1 except for the absence of the balancing layer. The decorative sheet in Comparative Example 2 showed significant convex curves (curls).

COMPARATIVE EXAMPLE 3

In Comparative Example 3, one sheet of melamine resin impregnated patterned paper as the decorative layer, two sheets of phenol resin impregnated core paper as the core layer were stacked, and the heat and pressure were applied to the stack of sheets under the same conditions as in the case of Embodiment 1 to obtain the decorative plate with a thickness of 0.56 mm. The phenol resin impregnated core paper to be used to form the core layer was produced by impregnating a Kraft paper with the phenol resin and drying the impregnated Kraft paper. The adhesive sheet was stacked on the core layer side of the decorative plate as in the case of Embodiment 1 to obtain the decorative sheet of Comparative Example 3. The decorative sheet of Comparative Example 3 showed significant convex curves (curls).

COMPARATIVE EXAMPLE 4

The production of Comparative Example 4 was basically the same as that of Embodiment 1 except that the aluminum hydroxide mixed paper of 110 g/m$^2$ (Product name: Sanwall, manufactured by Sanzen Paper Manufacturing Co., Ltd., the mixing ratio of aluminum hydroxide was 69% by mass) was used instead of the hydrous magnesium silicate mixed paper of 180 g/m$^2$ used to form the balancing layer in Embodiment 1.

The composition of the slurry to form the core layer in above-described Embodiments and Comparative Examples are shown in Table 1.

TABLE 1

| | Composition of slurry in core layer [parts by mass] | | | | | |
|---|---|---|---|---|---|---|
| | Acrylic resin emulsion | Aluminum hydroxide | Calcium carbonate | Silane coupling agent | Flame retardant | Total solid content |
| Embodiment 1 | 32 | 300 | 0 | 2.7 | 29 | 363.7 |
| Embodiment 2 | 32 | 300 | 0 | 2.7 | 29 | 363.7 |
| Embodiment 3 | 32 | 300 | 0 | 2.7 | 29 | 363.7 |
| Embodiment 4 | 32 | 300 | 0 | 2.7 | 29 | 363.7 |
| Embodiment 5 | 32 | 300 | 0 | 2.7 | 29 | 363.7 |
| Embodiment 6 | 32 | 300 | 0 | 2.7 | 29 | 363.7 |
| Embodiment 7 | 32 | 300 | 0 | 2.7 | 29 | 363.7 |
| Embodiment 8 | 32 | 300 | 0 | 2.7 | 29 | 363.7 |
| Embodiment 9 | 32 | 300 | 0 | 2.7 | 29 | 363.7 |
| Embodiment 10 | 17 | 300 | 0 | 2.7 | 29 | 348.7 |
| Embodiment 11 | 58 | 300 | 0 | 2.7 | 29 | 389.7 |
| Embodiment 12 | 32 | 300 | 0 | 2.7 | 29 | 363.7 |
| Embodiment 13 | 32 | 300 | 0 | 2.7 | 29 | 363.7 |
| Embodiment 14 | 32 | 600 | 0 | 2.7 | 29 | 663.7 |
| Embodiment 15 | 32 | 100 | 100 | 2.7 | 29 | 263.7 |
| Embodiment 16 | 32 | 300 | 0 | 1.8 | 29 | 362.8 |
| Embodiment 17 | 32 | 300 | 0 | 18 | 29 | 379 |
| Embodiment 18 | 32 | 300 | 0 | 2.7 | 3.5 | 338.2 |
| Embodiment 19 | 32 | 300 | 0 | 2.7 | 35 | 369.7 |
| Embodiment 20 | 32 | 300 | 0 | 2.7 | 29 | 363.7 |
| Embodiment 21 | 32 | 300 | 0 | 2.7 | 29 | 363.7 |
| Embodiment 22 | 32 | 300 | 0 | 2.7 | 29 | 363.7 |
| Embodiment 23 | 32 | 300 | 0 | 2.7 | 29 | 363.7 |
| Embodiment 24 | 32 | 300 | 0 | 2.7 | 29 | 363.7 |
| Embodiment 25 | 32 | 300 | 0 | 2.7 | 29 | 363.7 |
| Embodiment 26 | — | — | — | — | — | — |
| Embodiment 27 | — | — | — | — | — | — |
| Comparative Example 1 | 32 | 300 | 0 | 2.7 | 29 | 363.7 |
| Comparative Example 2 | 32 | 300 | 0 | 2.7 | 29 | 363.7 |
| Comparative Example 3 | — | — | — | — | — | — |
| Comparative Example 4 | 32 | 300 | 0 | 2.7 | 29 | 363.7 |

The blended amount of each composition to form the core layer in the above-described Embodiments and Comparative Examples is shown in Table 2.

TABLE 2

| | Amount of each contained component [g/m$^2$] | | | | |
|---|---|---|---|---|---|
| | Acrylic resin emulsion | Aluminum hydroxide | Calcium carbonate | Silane coupling agent | Flame retardant |
| Embodiment 1 | 29.3 | 274.3 | 0.0 | 2.5 | 26.5 |
| Embodiment 2 | 29.3 | 274.3 | 0.0 | 2.5 | 26.5 |
| Embodiment 3 | 29.3 | 274.3 | 0.0 | 2.5 | 26.5 |
| Embodiment 4 | 29.3 | 274.3 | 0.0 | 2.5 | 26.5 |
| Embodiment 5 | 29.3 | 274.3 | 0.0 | 2.5 | 26.5 |
| Embodiment 6 | 29.3 | 274.3 | 0.0 | 2.5 | 26.5 |
| Embodiment 7 | 29.3 | 274.3 | 0.0 | 2.5 | 26.5 |
| Embodiment 8 | 29.3 | 274.3 | 0.0 | 2.5 | 26.5 |
| Embodiment 9 | 29.3 | 274.3 | 0.0 | 2.5 | 26.5 |
| Embodiment 10 | 15.6 | 274.3 | 0.0 | 2.5 | 26.5 |
| Embodiment 11 | 53.1 | 274.3 | 0.0 | 2.5 | 26.5 |
| Embodiment 12 | 29.3 | 274.3 | 0.0 | 2.5 | 26.5 |
| Embodiment 13 | 29.3 | 274.3 | 0.0 | 2.5 | 26.5 |
| Embodiment 14 | 29.3 | 548.6 | 0.0 | 2.5 | 26.5 |
| Embodiment 15 | 29.3 | 91.4 | 91.4 | 2.5 | 26.5 |
| Embodiment 16 | 29.3 | 274.3 | 0.0 | 1.7 | 26.5 |
| Embodiment 17 | 29.3 | 274.3 | 0.0 | 16.7 | 26.5 |
| Embodiment 18 | 29.3 | 274.3 | 0.0 | 2.5 | 3.2 |
| Embodiment 19 | 29.3 | 274.3 | 0.0 | 2.5 | 32.0 |
| Embodiment 20 | 29.3 | 274.3 | 0.0 | 2.5 | 26.5 |
| Embodiment 21 | 29.3 | 274.3 | 0.0 | 2.5 | 26.5 |
| Embodiment 22 | 29.3 | 274.3 | 0.0 | 2.5 | 26.5 |
| Embodiment 23 | 29.3 | 274.3 | 0.0 | 2.5 | 26.5 |
| Embodiment 24 | 29.3 | 274.3 | 0.0 | 2.5 | 26.5 |
| Embodiment 25 | 29.3 | 274.3 | 0.0 | 2.5 | 26.5 |
| Embodiment 26 | — | — | — | — | — |
| Embodiment 27 | — | — | — | — | — |
| Comparative Example 1 | 29.3 | 274.3 | 0.0 | 2.5 | 26.5 |
| Comparative Example 2 | 29.3 | 274.3 | 0.0 | 2.5 | 26.5 |
| Comparative Example 3 | — | — | — | — | — |
| Comparative Example 4 | 29.3 | 274.3 | 0.0 | 2.5 | 26.5 |

The details of the balancing layer in the above-described Embodiments and Comparative Examples are shown in Table 3. In Table 3, the column of "base material" shows the fibrous base material used in the balancing layer, the column of "basis weight" shows the basis weight of the fibrous base material used in the balancing layer. The column of "impregnated resin" shows the component name of the flame retardant and the thermosetting resin with which the fibrous base material used in the balancing layer is impregnated. The column of "impregnation rate" shows the impregnation rate of the flame retardant and the thermosetting resin used in the balancing layer, and the impregnation rate is calculated by the calculation method defined in Formula 1. The column "impregnation amount" shows the weight per unit area of the flame retardant and the thermosetting resin used in the balancing layer.

TABLE 3

| | Balancing layer | | | | |
|---|---|---|---|---|---|
| | Base material | Basis weight (g/m$^2$) | Impregnating resin | Impregnation rate (% by mass) | Impregnation amount (g/m$^2$) |
| Embodiment 1 | Sepiolite mixed paper | 180 | Guanidine phosphate | 20 | 36 |
| Embodiment 2 | Sepiolite mixed paper | 180 | Vinyl ester | 20 | 36 |
| Embodiment 3 | Sepiolite mixed paper | 180 | Guanidine phosphate | 20 | 36 |
| Embodiment 4 | Sepiolite mixed paper | 180 | Guanidine phosphate | 20 | 36 |
| Embodiment 5 | Sepiolite mixed paper | 180 | Guanidine phosphate | 20 | 36 |
| Embodiment 6 | Sepiolite mixed paper | 120 | Guanidine phosphate | 20 | 24 |
| Embodiment 7 | Sepiolite mixed paper | 350 | Guanidine phosphate | 20 | 70 |
| Embodiment 8 | Sepiolite mixed paper | 180 | Guanidine phosphate | 20 | 36 |
| Embodiment 9 | Sepiolite mixed paper | 180 | Guanidine phosphate | 20 | 36 |
| Embodiment 10 | Sepiolite mixed paper | 180 | Guanidine phosphate | 20 | 36 |
| Embodiment 11 | Sepiolite mixed paper | 180 | Guanidine phosphate | 20 | 36 |
| Embodiment 12 | Sepiolite mixed paper | 180 | Guanidine phosphate | 20 | 36 |
| Embodiment 13 | Sepiolite mixed paper | 180 | Guanidine phosphate | 20 | 36 |
| Embodiment 14 | Sepiolite mixed paper | 180 | Guanidine phosphate | 20 | 36 |
| Embodiment 15 | Sepiolite mixed paper | 180 | Guanidine phosphate | 20 | 36 |
| Embodiment 16 | Sepiolite mixed paper | 180 | Guanidine phosphate | 20 | 36 |
| Embodiment 17 | Sepiolite mixed paper | 180 | Guanidine phosphate | 20 | 36 |
| Embodiment 18 | Sepiolite mixed paper | 180 | Guanidine phosphate | 20 | 36 |
| Embodiment 19 | Sepiolite mixed paper | 180 | Guanidine phosphate | 20 | 36 |
| Embodiment 20 | Sepiolite mixed paper | 180 | Guanidine phosphate | 20 | 36 |
| Embodiment 21 | Sepiolite mixed paper | 180 | Guanidine phosphate | 20 | 36 |
| Embodiment 22 | Sepiolite mixed paper | 180 | Guanidine phosphate | 5 | 9 |
| Embodiment 23 | Sepiolite mixed paper | 180 | Guanidine phosphate | 50 | 90 |
| Embodiment 24 | Sepiolite mixed paper | 180 | Melamine resin | 20 | 36 |
| Embodiment 25 | Sepiolite mixed paper | 180 | Phenol resin | 20 | 36 |
| Embodiment 26 | Sepiolite mixed paper | 180 | Guanidine phosphate | 20 | 36 |
| Embodiment 27 | Sepiolite mixed paper | 180 | Guanidine phosphate | 20 | 36 |
| Comparative Example 1 | Aluminum hydroxide mixed paper | 110 | Vinyl ester | 20 | 22 |
| Comparative Example 2 | — | — | — | — | — |
| Comparative Example 3 | — | — | — | — | — |
| Comparative Example 4 | Aluminum hydroxide mixed paper | 110 | Guanidine phosphate | 20 | 22 |

The layer structure of the decorative plate in the above-described Embodiments and Comparative Examples is shown in Table 4. In Table 4, each layer is shown in the order of being stacked sequentially from the bottom side toward the top side when Table 4 is read from the right column to the left column.

TABLE 4

| | Layer structure of decorative board | | | |
|---|---|---|---|---|
| Embodiment 1 | Decorative layer | Balancing layer | Core layer | — |
| Embodiment 2 | Decorative layer | Balancing layer | Core layer | — |
| Embodiment 3 | Decorative layer | Balancing layer | Core layer | — |
| Embodiment 4 | Decorative layer | Balancing layer | Core layer | — |
| Embodiment 5 | Decorative layer | Balancing layer | Core layer | — |
| Embodiment 6 | Decorative layer | Balancing layer | Core layer | — |
| Embodiment 7 | Decorative layer | Balancing layer | Core layer | — |
| Embodiment 8 | Decorative layer | Core layer | Balancing layer | — |
| Embodiment 9 | Decorative layer | Balancing layer | Core layer | Balancing layer |
| Embodiment 10 | Decorative layer | Balancing layer | Core layer | — |
| Embodiment 11 | Decorative layer | Balancing layer | Core layer | — |
| Embodiment 12 | Decorative layer | Balancing layer | Core layer | — |
| Embodiment 13 | Decorative layer | Balancing layer | Core layer | — |
| Embodiment 14 | Decorative layer | Balancing layer | Core layer | — |
| Embodiment 15 | Decorative layer | Balancing layer | Core layer | — |
| Embodiment 16 | Decorative layer | Balancing layer | Core layer | — |
| Embodiment 17 | Decorative layer | Balancing layer | Core layer | — |
| Embodiment 18 | Decorative layer | Balancing layer | Core layer | — |
| Embodiment 19 | Decorative layer | Balancing layer | Core layer | — |
| Embodiment 20 | Decorative layer | Balancing layer | Core layer | — |
| Embodiment 21 | Decorative layer | Balancing layer | Core layer | — |
| Embodiment 22 | Decorative layer | Balancing layer | Core layer | — |
| Embodiment 23 | Decorative layer | Balancing layer | Core layer | — |
| Embodiment 24 | Decorative layer | Balancing layer | Core layer | — |
| Embodiment 25 | Decorative layer | Balancing layer | Core layer | — |
| Embodiment 26 | Decorative layer | Balancing layer | Balancing layer | — |
| Embodiment 27 | Decorative layer | Balancing layer | — | — |
| Comparative Example 1 | Decorative layer | Balancing layer | Core layer | — |
| Comparative Example 2 | Decorative layer | Core layer | — | — |
| Comparative Example 3 | Decorative layer | Ph Core paper | Ph Core paper | — |
| Comparative Example 4 | Decorative layer | Balancing layer | Core layer | — |

In Table 4, "the Ph core paper" means the phenol resin impregnated core paper.

The structure of the adhesive layer in the above-described Embodiments and Comparative Examples is shown in Table 5. In Table 5, "Type" means the component of the adhesive used in the adhesive layer, "Total adhesive thickness" means the thickness of the adhesive portion of the adhesive sheet which is formed by applying the adhesive to the release paper.

TABLE 5

| | Adhesive layer | |
|---|---|---|
| | Type | Total adhesive thickness (μm) |
| Embodiment 1 | Acrylic | 136 |
| Embodiment 2 | Acrylic | 136 |
| Embodiment 3 | Acrylic | 80 |
| Embodiment 4 | Acrylic | 50 |
| Embodiment 5 | Solvent rubber | 140 |
| Embodiment 6 | Acrylic | 136 |
| Embodiment 7 | Acrylic | 136 |
| Embodiment 8 | Acrylic | 136 |
| Embodiment 9 | Acrylic | 136 |
| Embodiment 10 | Acrylic | 136 |

TABLE 5-continued

| | Adhesive layer | |
|---|---|---|
| | Type | Total adhesive thickness (μm) |
| Embodiment 11 | Acrylic | 136 |
| Embodiment 12 | Acrylic | 136 |
| Embodiment 13 | Acrylic | 136 |
| Embodiment 14 | Acrylic | 136 |
| Embodiment 15 | Acrylic | 136 |
| Embodiment 16 | Acrylic | 136 |
| Embodiment 17 | Acrylic | 136 |
| Embodiment 18 | Acrylic | 136 |
| Embodiment 19 | Acrylic | 136 |
| Embodiment 20 | Acrylic | 136 |
| Embodiment 21 | Acrylic | 136 |
| Embodiment 22 | Acrylic | 136 |
| Embodiment 23 | Acrylic | 136 |
| Embodiment 24 | Acrylic | 136 |
| Embodiment 25 | Acrylic | 136 |
| Embodiment 26 | Acrylic | 136 |
| Embodiment 27 | Acrylic | 136 |
| Comparative Example 1 | Acrylic | 136 |
| Comparative Example 2 | Acrylic | 136 |
| Comparative Example 3 | Acrylic | 136 |
| Comparative Example 4 | Acrylic | 136 |

Evaluation results of the decorative sheet in the above-described Embodiments and Comparative Examples are shown in Table 6.

TABLE 6

| | Evaluation of decorative plate | | | Evaluation of adhesive decorative sheet | | |
|---|---|---|---|---|---|---|
| | | Non-combustibility test | | | Non-combustibility test | |
| | Thickness (mm) | Heat release value (MJ/m$^2$) | Shape retainability | Adhesive strength (N/cm$^2$) | Heat release value (MJ/m$^2$) | Shape retainability |
| Embodiment 1 | 0.48 | 2.9 | ○ | 64.4 | 5.9 | ○ |
| Embodiment 2 | 0.45 | 4.2 | ○ | 64.4 | 7.2 | ○ |
| Embodiment 3 | 0.48 | 2.9 | ○ | 62.2 | 5.7 | ○ |
| Embodiment 4 | 0.48 | 2.9 | ○ | 55.2 | 5.0 | ○ |
| Embodiment 5 | 0.48 | 2.9 | ○ | 70.0 | 6.3 | ○ |
| Embodiment 6 | 0.43 | 3.4 | ○ | 64.4 | 6.4 | ○ |
| Embodiment 7 | 0.69 | 3.5 | ○ | 64.4 | 6.5 | ○ |
| Embodiment 8 | 0.47 | 2.0 | ○ | 64.4 | 4.8 | ○ |
| Embodiment 9 | 0.62 | 2.4 | ○ | 64.4 | 4.9 | ○ |
| Embodiment 10 | 0.48 | 2.1 | ○ | 64.4 | 5.0 | ○ |
| Embodiment 11 | 0.47 | 3.6 | ○ | 64.4 | 7.0 | ○ |
| Embodiment 12 | 0.47 | 2.2 | ○ | 64.4 | 5.0 | ○ |
| Embodiment 13 | 0.48 | 2.9 | ○ | 64.4 | 5.7 | ○ |
| Embodiment 14 | 0.47 | 2.7 | ○ | 64.4 | 5.7 | ○ |
| Embodiment 15 | 0.48 | 2.5 | ○ | 64.4 | 5.6 | ○ |
| Embodiment 16 | 0.49 | 2.1 | ○ | 64.4 | 5.5 | ○ |
| Embodiment 17 | 0.49 | 2.8 | ○ | 64.4 | 5.7 | ○ |
| Embodiment 18 | 0.49 | 2.9 | ○ | 64.4 | 5.7 | ○ |
| Embodiment 19 | 0.47 | 2.8 | ○ | 64.4 | 5.9 | ○ |
| Embodiment 20 | 0.46 | 2.8 | ○ | 64.4 | 5.7 | ○ |
| Embodiment 21 | 0.47 | 3.3 | ○ | 64.4 | 6.7 | ○ |
| Embodiment 22 | 0.44 | 2.3 | ○ | 64.4 | 5.7 | ○ |
| Embodiment 23 | 0.48 | 1.8 | ○ | 64.4 | 5.0 | ○ |
| Embodiment 24 | 0.46 | 3.0 | ○ | 64.4 | 6.0 | ○ |
| Embodiment 25 | 0.45 | 2.4 | ○ | 64.4 | 5.9 | ○ |
| Embodiment 26 | 0.40 | 2.1 | ○ | 64.4 | 4.2 | ○ |
| Embodiment 27 | 0.26 | 1.6 | ○ | 64.4 | 4.0 | ○ |
| Comparative Example 1 | 0.45 | 3.1 | X | 64.4 | 6.1 | X |
| Comparative Example 2 | 0.35 | 2.5 | X | 64.4 | 5.5 | X |
| Comparative Example 3 | 0.56 | 20 or more x | XX | 64.4 | 20 or more x | XX |
| Comparative Example 4 | 0.39 | 4.1 | X | 64.4 | 7.1 | X |

The evaluation methods for the decorative sheet of the above-described Embodiments and Comparative Examples were as follows.

(1) Thickness

The thickness of the decorative plate before the adhesive sheet is attached was measured with a micrometer.

Non-Combustibility (2) Total Heat Release

The decorative plate without the adhesive sheet attached and the decorative sheet with the adhesive sheet attached were subjected to the test as samples. A 20-minute heat release test with a cone calorimeter was carried out on each sample in accordance with ISO 5660.

(3) Shape Retainablity

Figure 4:
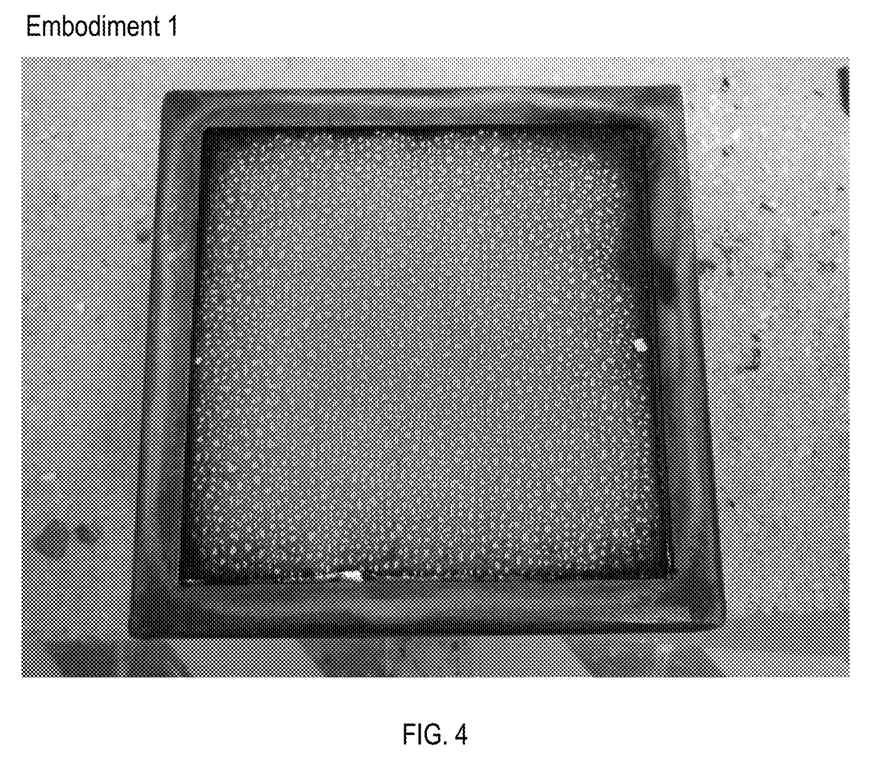
FIG. 4 is a photograph showing a result of shape-retainability test of the decorative sheet with adhesive in Example 1.
Figure 5:
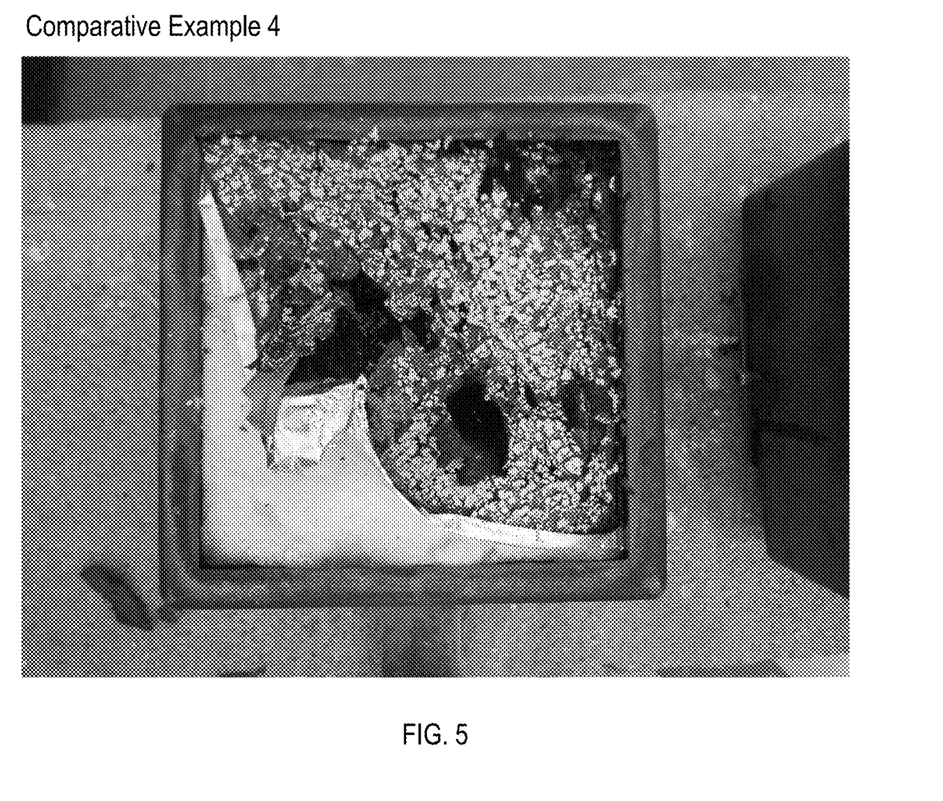
FIG. 5 is a photograph showing a result of shape-retainability test of the decorative sheet with adhesive in Comparative Example 4.

A 20-minute heat release test with a cone calorimeter was carried out on each sample in accordance with ISO 5660. At the time of the test for each sample, in a case where the total heat release of each sample is 8 $MJ/m^2$ or less, the peak rate of heat release of each sample is maintained less than 200 $kW/m^2$ for 10 seconds, and splits and cracks penetrating the back side of the sample were not found in the tested sample (shape was retained), the sample was evaluated as "○". In a case where the tested sample had splits and cracks (the shape was not retained), the sample was evaluated as "x", and in a case where the decorative sheet as a whole was combusted and nothing was left, the sample was evaluated as "xx". A photograph of the decorative sheet in Embodiment 1 after the test is shown in FIG. 4. A photograph of the decorative sheet of Comparative Example 4 after the test is shown in FIG. 5.

(4) Adhesive Strength of Decorative Sheet

A 300 mm×150 mm piece was cut out from the decorative sheet. The silicone release paper was peeled off from the piece to expose the adhesive layer. The adhesive layer surface of the decorative sheet and an aluminum plate 2 mm thick were adhered to each other. Then, a hand roller weighing 2 kg was reciprocated twice on the aluminum plate. The piece made in the above process was used as a sample. In the sample, the surface of the decorative layer side in the decorative sheet was adhered to a 40 mm×40 mm fixture with a glue (cyanoacrylate).

After curing the sample for one day under the temperature of 23° C. and relative humidity of 50%, a force was applied to the sample in a direction to separate the aluminum plate and the adhesive layer with a glue strength testing device in Building Research Institute Method (manufactured by Oxjack Co., Ltd.) so as to measure the tensile strength. The value of the tensile strength was considered as a measurement value of the adhesive strength.

According to the above-described test results, the decorative sheet with the adhesive exhibited a higher total heat release compared to the decorative plate before attaching the adhesive sheet in all Embodiments and Comparative Examples. Among them, the decorative sheets in Embodiment 1 to 27 exhibited the total heat release of 8 $MJ/m^2$ or less and satisfied a standard of the current non-combustibility test of the Japanese Building Standard Law. The decorative sheets in Embodiment 1 to 27 were not burned and also maintained the shapes even after the heat release test.

On the other hand, the decorative sheets in Comparative Examples 1, 2, and 4 were deformed during the heat release test. In Comparative Examples 1 and 4, the balancing layer is formed from the aluminum hydroxide mixed paper, not from the magnesium silicate (sepiolite) mixed paper as in the case of Embodiment 1 to 27. This is considered to be a reason for the deformation of the shape during the test. The decorative sheet in Comparative Example 2 did not comprise the balancing layer having the magnesium silicate (sepiolite) mixed paper as in the case of Embodiments 1 to 27. This is considered to be a reason for the deformation of the shape during the test.

The decorative sheet in Comparative Example 3 was burned completely during the heat release test. The decorative sheet in Comparative Example 3 had the total heat release of more than 8 $MJ/m^2$, and the decorative sheet failed to satisfy a standard of the current non-combustibility test of the Japanese Building Standard. In Comparative Example 3, it is considered that the decorative sheet was burned during the test since the decorative sheet did not comprise the balancing layer having the magnesium silicate (sepiolite) mixed paper as in the case of Embodiments 1 to 27, and the Kraft paper was used for the core layer, and the flame retardant was not included in the core layer.

The invention claimed is:

1. A decorative sheet with adhesive comprising:
   a decorative plate layer having a top and a bottom; and
   an adhesive layer arranged on the bottom of the decorative plate layer,
   wherein the decorative plate layer comprises a heat- and pressure-consolidated laminate assembly including a decorative layer and a mixed paper layer that is arranged adjacent to the bottom of the decorative layer, the mixed paper layer including a mixed paper and a component selected from the group consisting of a nitrogen flame retardant and a phosphorus-nitrogen flame retardant,
   wherein the mixed paper contains a magnesium silicate compound having bound water,
   wherein the mixed paper layer comprises the mixed paper that is impregnated with the component and dried, and
   wherein the decorative layer comprises a decorative paper that is impregnated with a thermosetting resin and dried.

2. The decorative sheet with adhesive according to claim 1, wherein the decorative plate layer further comprises a core layer made of a prepreg containing a fibrous base material.

3. The decorative sheet with adhesive according to claim 2, wherein a stacking structure of the decorative plate layer includes the core layer, the mixed paper layer, and the decorative layer in this order from the bottom of the decorative plate layer.

4. The decorative sheet with adhesive according to claim 2, wherein the prepreg included in the core layer contains endothermic metal hydroxide and a binder component in addition to the fibrous base material.

5. The decorative sheet with adhesive according to claim 2, wherein the prepreg included in the core layer contains an acrylic resin emulsion in addition to the fibrous base material.

6. The decorative sheet with adhesive according to claim 2, wherein the core layer further comprises a flame retardant.

7. The decorative sheet with adhesive according to claim 6, wherein the core layer contains the flame retardant in a range of 1 to 100 g/m$^2$.

8. The decorative sheet with adhesive according to claim 6, wherein the flame retardant in the core layer is a component selected from a group consisting of a nitrogen flame retardant and a phosphorus-nitrogen flame retardant.

9. The decorative sheet with adhesive according to claim 8, wherein an amount of nitrogen contained in the phosphorus-nitrogen flame retardant is 1 to 50% by mass.

10. The decorative sheet with adhesive according to claim 1, wherein the component is present in the mixed paper layer in an amount is in a range of 9 to 90 g/m$^2$.

11. The decorative sheet with adhesive according to claim 1, having a thickness of 0.2 to 2.0 mm.

12. The decorative sheet with adhesive according to claim 1, having a thickness of 0.43 to 0.69 mm.

13. The decorative sheet with adhesive according to claim 1, wherein phosphorus-nitrogen flame retardant is present in the mixed paper layer and the phosphorus-nitrogen flame retardant comprises guanidine phosphate and/or guanyl urea phosphate.

14. The decorative sheet with adhesive according to claim 1, wherein the thermosetting resin contained in the decorative layer comprises a melamine-formaldehyde resin.

\* \* \* \* \*